(12) United States Patent
Jo

(10) Patent No.: US 12,472,899 B2
(45) Date of Patent: Nov. 18, 2025

(54) CURTAIN AIRBAG APPARATUS

(71) Applicant: HYUNDAI MOBIS CO., LTD., Seoul (KR)

(72) Inventor: Kum Ho Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/799,177

(22) Filed: Aug. 9, 2024

(65) Prior Publication Data
US 2025/0303998 A1    Oct. 2, 2025

(30) Foreign Application Priority Data
Mar. 29, 2024   (KR) .................. 10-2024-0043220

(51) Int. Cl.
  *B60R 21/233*   (2006.01)
  *B60R 21/21*    (2011.01)
  *B60R 21/261*   (2011.01)

(52) U.S. Cl.
  CPC ............ *B60R 21/233* (2013.01); *B60R 21/21* (2013.01); *B60R 21/261* (2013.01); *B60R 2021/23308* (2013.01)

(58) Field of Classification Search
  CPC .... B60R 21/213; B60R 21/232; B60R 21/231
  See application file for complete search history.

(56) References Cited

U.S. PATENT DOCUMENTS

| | | | |
|---|---|---|---|
| 6,846,010 B2 | 1/2005 | Enders | |
| 7,077,425 B2 * | 7/2006 | Ogawa | B60R 21/213 |
| | | | 280/730.2 |
| 8,622,420 B2 | 1/2014 | Kato et al. | |
| 9,211,863 B2 | 12/2015 | Kashio | |
| 10,214,173 B2 * | 2/2019 | Asada | B60R 21/213 |
| 10,836,342 B2 | 11/2020 | Hayashi et al. | |
| 11,370,383 B2 * | 6/2022 | Jinnai | B60R 21/232 |
| 2012/0286499 A1 * | 11/2012 | Wiik | B60R 21/2334 |
| | | | 280/730.2 |

(Continued)

FOREIGN PATENT DOCUMENTS

| | | | | |
|---|---|---|---|---|
| DE | 102010002573 A1 * | 11/2010 | .......... | B60R 21/232 |
| JP | 2010159026 A * | 7/2010 | | |

(Continued)

OTHER PUBLICATIONS

Extended European Search Report Issued on Mar. 20, 2025, in Counterpart European Patent Application No. 24194613.6 (10 Pages in English).

*Primary Examiner* — Nicole T Verley
(74) *Attorney, Agent, or Firm* — NSIP Law

(57) ABSTRACT

A curtain airbag apparatus for a vehicle is provided. The apparatus includes an airbag cushion including a first main chamber, a second main chamber, and a third main chamber respectively arranged in a first-row area, a second-row area, and a third-row area in the vehicle, and a diffuser coupled to the airbag cushion to distribute gas directed towards the first main chamber, the second main chamber, and the third main chamber. The airbag cushion further includes an extra chamber arranged between the second main chamber and the third main chamber to assist in increasing speed of deployment of the third main chamber. The curtain airbag is for installation between pillar trims in the vehicle.

5 Claims, 3 Drawing Sheets

(56) References Cited

U.S. PATENT DOCUMENTS

| | | | |
|---|---|---|---|
| 2015/0210242 A1* | 7/2015 | Kashio | B60R 21/23138 |
| | | | 280/730.2 |
| 2016/0221527 A1* | 8/2016 | Sugimori | B60R 21/213 |
| 2017/0240131 A1* | 8/2017 | Low | B60R 21/2334 |
| 2018/0201220 A1* | 7/2018 | Sugimori | B60R 21/237 |
| 2019/0061669 A1* | 2/2019 | Hayashi | B60R 21/233 |
| 2019/0126882 A1* | 5/2019 | Hayashi | B60R 21/2338 |
| 2023/0211749 A1* | 7/2023 | Fecteau | B60R 21/237 |
| | | | 280/741 |

FOREIGN PATENT DOCUMENTS

| | | | | |
|---|---|---|---|---|
| JP | 2011240884 A | * | 12/2011 | |
| JP | 2014166839 A | * | 9/2014 | |
| JP | 2018114828 A | * | 7/2018 | B60R 21/213 |
| JP | 7103174 B2 | * | 7/2022 | B60R 21/213 |
| KR | 101481769 B1 | * | 1/2015 | |
| KR | 20240047519 A | * | 4/2024 | |
| KR | 102685330 B1 | * | 7/2024 | |
| WO | WO-2014132810 A1 | * | 9/2014 | B60R 21/213 |

* cited by examiner

140: 141, 142, 143, 144
160: 161, 162, 163, 164, 165, 166

CURTAIN AIRBAG APPARATUS

CROSS-REFERENCE TO RELATED APPLICATION(S)

The present application claims priority to and the benefit under 35 USC § 119(a) of Korean Patent Application No. 10-2024-0043220, filed on Mar. 29, 2024, in the Korean Intellectual Property Office, the entire disclosure of which is hereby incorporated by reference for all purposes.

BACKGROUND

1. Field

The present invention relates to a curtain airbag apparatus.

2. Description of the Related Art

Generally, vehicles are equipped with various types of airbags to protect passengers in the event of an accident. Among them, curtain airbags mounted atop multiple pillars along the sides of front and rear doors, deploy to shield occupants with the airbag cushions unfolding downward in case of rollovers or side-impact collisions. Curtain airbags may include an airbag cushion that deploys inside the passenger compartment and an inflator that generates and releases gas into the cushion.

The airbag cushion stretches in a rectangular shape along the vehicle's length direction (from the passenger compartment towards the engine compartment or vice versa), fully inflating with gas from the inflator to cover the entire side of the passenger compartment.

Recently, the length of airbag cushions has increased due to the increasing size of vehicles. For example, vehicles designed to accommodate multiple passengers (e.g., six or more seats) may have a first-row area with the driver and front passenger seats, followed by a second-row area, and potentially a third-row area behind them. Therefore, the airbag cushion has come to have a length to cover the side of the third row area.

Vehicles also have trim that covers the pillars forming the vehicle's frame. The trim may include front pillar trim for the first-row area, center pillar trim for the second-row area, and rear pillar trim for the third-row area. Such trims take on a protruding shape towards the interior of the passenger compartment along the width direction, intersecting with the length direction (from the driver's seat towards the front passenger seat or vice versa).

These trims can potentially obstruct the deployment of airbag cushions. For example, the airbag cushion is equipped with first chamber, second chamber, and third chamber components to cover the vehicle's first-row area, second-row area, and third-row area, respectively arranged sequentially along the length direction (from the engine compartment towards the passenger compartment). Traditionally, airbag cushions do not have a distinct structure that separates the second chamber and third chamber. For the airbag cushion to be stored inside the vehicle, the third chamber is folded over towards the second chamber and then rolled while folded.

Therefore, with the traditional airbag cushion structure described above, when it unfolds by rolling out, the third chamber deploys slower than the first and second chambers. As a result, the third chamber, which begins deployment later than the other chambers, may not properly implement the shape required to protect passengers sitting in the third-row area, as it contacts the rear pillar trim.

Therefore, there is an increasing need for research to prevent delayed deployment of the airbag cushion, ensuring swift shape formation to protect passengers sitting in the third-row area.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention has been conceive to solve the above problems, and it is an object of the present invention to provide an improved curtain airbag apparatus that is capable of ensuring swift shape formation without delay in the deployment of the airbag cushion, thereby protecting passengers sitting in the third-row area.

In a general aspect of the disclosure, a curtain airbag apparatus for a vehicle, includes: an airbag cushion including: a first main chamber, a second main chamber, and a third main chamber respectively arranged in a first-row area, a second-row area, and a third-row area in the vehicle; and a diffuser coupled to the airbag cushion and configured to distribute gas directed towards the first main chamber, the second main chamber, and the third main chamber, wherein the airbag cushion further includes: an extra chamber arranged between the second main chamber and the third main chamber, and configured to assist in increasing speed of deployment of the third main chamber, and wherein the curtain airbag apparatus is configured to be installed between a plurality of pillar trims in the vehicle.

The airbag cushion may further include partitions positioned between the first main chamber, the second main chamber, and the third main chamber, and the partitions may include: a first partition positioned in the main chamber; a second partition positioned between the first main chamber and the second main chamber; and a third partition compartmentalizing the third main chamber and the extra chamber.

The extra chamber may be is arranged closer to the second main chamber than to the third main chamber.

The third main chamber may include: a first inflation portion configured to be inflated by gas distributed through the diffuser during deployment of the airbag cushion; and a second inflation portion connected to the first inflation portion and configured to be inflated by gas flowing into the first inflation portion.

The second inflation portion may be configured to maintain a folded state inside the first inflation portion before deployment of the airbag cushion.

The folded second inflation portion may be configured to be deployed along the direction from the second main chamber toward the third main chamber by being pushed by the gas distributed through the diffuser.

In the state of being deployed, the extra chamber may include a lower end positioned lower than a lower end of the third main chamber.

In another general aspect of the disclosure, a curtain airbag apparatus for a vehicle, includes: an airbag cushion comprising a first main chamber, a second main chamber, and a third main chamber respectively arranged in a first-row area, a second-row area, and a third-row area, of the vehicle; and a diffuser coupled to the airbag cushion and configured to distribute gas directed towards the first main chamber, the second main chamber, and the third main chamber, wherein the third main chamber of the airbag cushion includes: a first inflation portion configured to inflate by gas distributed through the diffuser during deployment of the airbag cushion; and a second inflation portion configured to: maintain a folded state inside the first inflation portion before deployment of the airbag cushion; and inflate by gas flowing into the first inflation portion during deployment of the airbag cushion, and wherein the curtain airbag apparatus is configured to be installed between a plurality of pillar trims in the vehicle.

The folded second inflation portion may be configured to be deployed along the direction from the second main chamber toward the third main chamber by being pushed by the gas distributed through the diffuser.

The airbag cushion may further include an extra chamber arranged between the second main chamber and the third main chamber, and the extra chamber may be configured to assist in the rapid deployment of the third main chamber.

In yet another general aspect of the disclosure, a curtain airbag apparatus for a vehicle, the vehicle including seats arranged in a first-row area, a second-row area, and a third-row area, includes: an airbag cushion comprising a first main chamber, a second main chamber, and a third main chamber respectively configured to deploy in the first-row area, a second-row area, and a third-row area; an extra chamber in communication with the second main chamber and the third main chamber; and a diffuser coupled to the airbag cushion and configured to deploy the airbag cushion by distributing gas directly into the first main chamber and the second main chamber, wherein the third main chamber and the extra chamber are configured to receive gas from the diffuser via the second chamber, and wherein the extra chamber is configured to increase speed of deployment of the third chamber.

The airbag cushion may be configured to be installed between pillar trims in the vehicle.

The airbag cushion may further include: a first partition in the first main chamber;
 a second partition positioned between the first main chamber and the second main chamber; a third partition separating the second main chamber and the extra chamber; and a fourth partition in communication with the second main chamber and the extra chamber.

The extra chamber may be arranged positioned below the second main chamber.

Upon deployment of the airbag, the extra chamber may include a lower end positioned lower than a lower end of the third main chamber.

The third main chamber may include: a first inflation portion configured to be inflated by gas distributed through the diffuser during deployment of the airbag cushion; and a second inflation portion connected to the first inflation portion and configured to be inflated by gas flowing into the first inflation portion.

The second inflation portion may be configured to maintain a folded state inside the first inflation portion prior to a deployment of the airbag cushion.

The folded second inflation portion may be configured to be deployed along a direction from the second main chamber toward the third main chamber by the gas distributed through the diffuser.

DETAILED DESCRIPTION

Figure 1:
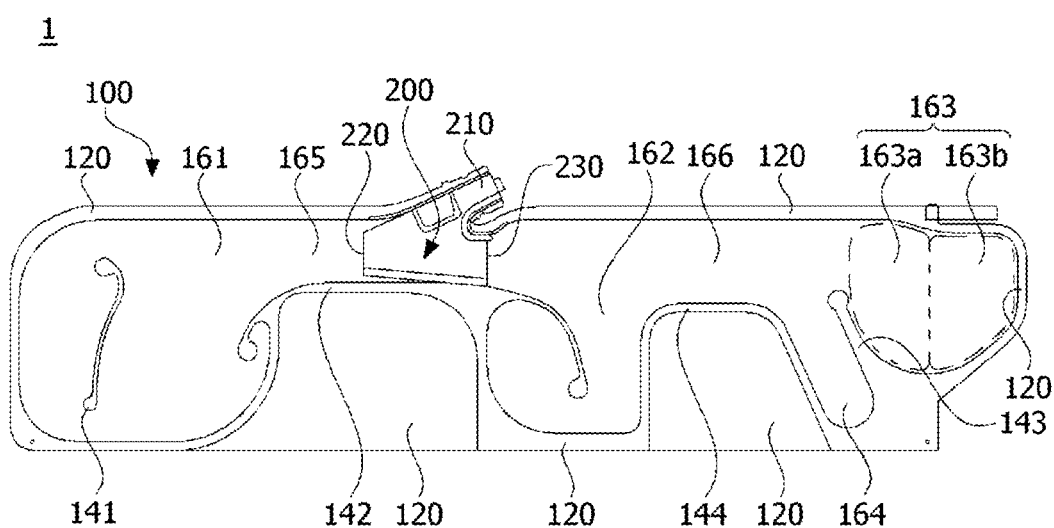
FIG. 1 is a diagram illustrating a curtain airbag apparatus according to an embodiment of the present invention.

While the present invention admits various modifications, the following detailed descriptions and drawings focus on preferred embodiments for clarity. However, such embodiments are not intended to limit the invention and it should be understood that the embodiments encompass all modifications, equivalents, and alternatives within the spirit and scope of the invention.

As used herein, terms including an ordinal number such as "first" and "second" can be used to describe various components without limiting the components. The terms are used only for distinguishing one component from another component. For example, a first element may be referred to as a second element and, similarly, the second element may be referred to as the first element, without departing from the scope of the present invention. The expression "and/or" is used to convey the possibility of including either a combination of multiple related listed items or any one of the related listed items.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

In the description of embodiments, when a component is described as being formed or placed "on or under" another component, "on (above)" or "under (below)" may include not only cases where two components directly contact each other but also cases where one or more other components are formed or positioned between the two components. Additionally, when expressed as "on (above or under (below),"it may include not only the upward direction but also the downward direction relative to a single component.

The terminology used in this application is employed merely to describe specific embodiments and is not intended to limit the scope of the present invention. The singular forms are intended to include the plural forms as well unless the context clearly indicates otherwise. In this application, terms such as "comprising" or "having" indicate the presence of the features, numbers, steps, operations, components, or parts listed in the specification, without excluding the presence or possibility of one or more other features, numbers, steps, operations, components, or parts or their combinations.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, a description is made of the curtain airbag apparatus with reference to the accompanying drawings where identical or corresponding components are assigned the same reference numbers, and redundant descriptions are omitted.

FIG. 1 is a diagram illustrating a curtain airbag apparatus according to an embodiment of the present invention.

In this embodiment, the term "length direction" refers to the direction from the passenger compartment (not shown) to the engine compartment (not shown) or vice versa.

With reference to FIG. 1, the curtain airbag apparatus 1 according to an embodiment of the present invention may include an airbag cushion 100 and a diffuser 200. In addition, the curtain airbag apparatus 1 may further include an inflator (not shown) that generates gas inside and discharges the gas into the interior of the airbag cushion 100. The curtain airbag apparatus 1 may be disposed between a plurality of pillar trims (not shown) installed in the vehicle.

The airbag cushion 100 may be formed by combining two elastic materials. The airbag cushion 100 may be placed between the front pillar trim (not shown) located in the first-row area of the vehicle where the driver's seat and front passenger seat are positioned, and the rear pillar trim (not shown) located in the third-row area behind the driver's seat and front passenger seat along the vehicle's length direction, deployable to cover the windows disposed on the sides of the vehicle. Additionally, the airbag cushion 100 may be rolled and folded along a direction (height direction) intersecting the length direction. Therefore, the airbag cushion 100 may be deployed by rolling along the height direction towards the floor of the passenger compartment.

Accordingly, the airbag cushion 100 is positioned between the front pillar trim and rear pillar trim, and may be deployed to cover the center pillar trim (not shown) disposed in the second-row area between the first-row area and the third-row area. The airbag cushion 100 may include a joint 120, partitions 140, chambers 160, and a coupling portion 180.

The joint 120 is a part formed in the edge area of the airbag cushion 100, where the edges of the two materials forming the airbag cushion 100 may be joined together. The joint 120 is an inactive portion of the airbag cushion 100, meaning it does not inflate with gas generated by the inflator. Thus, the inner area of the joint 120 in the airbag cushion 100 may be inflated by the gas generated from the inflator.

The partitions 140 may be positioned between a first main chamber 161, a second main chamber 162, and a third main chamber 163 to be described later. The partitions 140, like the joint 120, are inactive portions where two materials of the airbag cushion 100 are joined together, and they are non-inflatable parts of the airbag cushion 100, meaning they do not inflate with gas generated by the inflator. The partitions 140 may become one of the elements forming the shape of the first main chamber 161, second main chamber 162, and third main chamber 163 as the airbag cushion 100 expands. The partitions 140 may include a first partition 141, a second partition 142, a third partition 143, and a fourth partition 144.

The first partition 141 may be positioned in the first main chamber 161 to be described later. The first partition 141 can assist in the rapid deployment of the first main chamber 161.

The second partition 142 may be positioned between the first main chamber 161 and the second main chamber 162 to be described later. The second partition 142 may also be arranged in a first sub-chamber 165 to be described later. The second partition 142 may be positioned between the first main chamber 161 and the third main chamber 163. The second partition 142 may assist in the rapid deployment of the first main chamber 161 and the second chamber 160, and may be one of the factors determining the shape of the first sub-chamber 165 to be described later. The second partition 142 may support the diffuser 200.

The third partition 143 may be positioned between the third main chamber 163 and the extra chamber 164 to be described later. The third partition 143 may compartmentalize the third main chamber 163 and the extra chamber 164. That is, the third partition 143 may serve as one of the elements shaping the form of the third main chamber 163 and the extra chamber 164.

The fourth partition 144 may be positioned between the second partition 142 and the third partition 143 to be described later. The fourth partition 144, together with the third partition 143, may be one of the factors determining the shape of the extra chamber 164 to be described later. The fourth partition 144 may be shaped along a portion of the joint 120.

The chambers 160 are the portions of the airbag cushion that exclude the joint 120, the partitions 140, the coupling portion 180; the chambers 160 inflate due to gas generated from the inflator. The chambers 160 may include a first main chamber 161, a second main chamber 162, and a third main chamber 163 arranged in the first-row area, the second-row area, and the third-row area, respectively, within the vehicle (passenger compartment).

The first main chamber 161 may be arranged between the first partition 141 and the second partition 142. The first main chamber 161 may come into contact with occupants sitting in seats located in the first-row area, thereby helping to suppress the passengers' movement.

The second main chamber 162 may be arranged between the first main chamber 161 and the third main chamber 163. Therefore, the second main chamber 162 may come into contact with occupants sitting in seats located in the second-row area, thereby helping to suppress the passengers' movement. The second main chamber 162 may be arranged between the partition 142 and the fourth partition 144.

The third main chamber 163 may be arranged towards the rear of the fourth partition 144 of the partitions 140 in the length direction. The third main chamber 163 may come into contact with occupants sitting in seats located in the third-row area, thereby helping to suppress the passengers' movement. Here, the third main chamber 163 may cover a portion of the rear pillar trim when the airbag cushion 100 is deployed.

The chambers 160 may also include the extra chamber 164, the first sub-chamber 165, and the second sub-chamber 166.

The extra chamber 164 may be arranged between the second main chamber 162 and the third main chamber 163. The extra chamber 164 may also be arranged closer to the second main chamber 162 than to the third main chamber 163.

The extra chamber 164 may assist in the rapid deployment of the third main chamber 163. In more detail, when the airbag cushion 100 is deployed, the lower end of the extra chamber 164 may be positioned lower (in the vertical direction) than the lower end of the third main chamber 163. The extra chamber 164 having this shape may inflate and deploy by gas generated from the inflator in the airbag cushion 100. In this case, since the lower end of the extra chamber 164 is positioned lower (in the vertical direction) than the lower end of the third main chamber 163, the extra chamber 164 may pull the airbag cushion 100 towards the floor of the passenger compartment in the vertical direction. This phenomenon may facilitate the rapid deployment of the third main chamber 163.

In this way, the extra chamber 164 may assist in the rapid deployment of the third main chamber 163, ensuring the long airbag cushion 100 deploys evenly. Therefore, the phenomenon where the first main chamber 161, second main chamber 162, and third main chamber 163 of the long airbag cushion 100 have different impact absorption timings can be prevented. In this way, placing the extra chamber 164 along the length direction in front of the third main chamber 163 may be preferable to avoid obstructing the deployment of the third main chamber 163.

The first sub-chamber 165 may be arranged between the first main chamber 161 and the third main chamber 162. The first sub-chamber 165 may be arranged between the joint 120 and the second partition 142. The first sub-chamber 165 may connect the first main chamber 161 and the second main chamber 162. The diffuser 200 may be placed in the first sub-chamber 165. The first sub-chamber 165 may serve as a passage for the gas distributed by the diffuser 200 to travel through. The gas passed through the first sub-chamber 165 may be directed to the first main chamber 161 and the second main chamber 162.

The second sub-chamber 166 may be arranged between the second main chamber 162 and the third main chamber 163. The second sub-chamber 166 may also be arranged between the third main chamber 162 and the extra chamber 164. The second sub-chamber 166 may be arranged between the joint 120 and the fourth partition 144. The second sub-chamber 166 may connect the second main chamber 162 and the third main chamber 163. The second sub-chamber 166 may connect the second main chamber 162 and the extra chamber 164.

The second sub-chamber 166 may be connected to the first sub-chamber 165. Therefore, the second sub-chamber 166 may serve as a passage for the gas passed through the diffuser 200. The gas moved through the second sub-chamber 166 may be directed to the third main chamber 163 and the extra chamber 164.

The coupling portion 180 may be formed on a part of the joint 120. In more detail, the coupling portion 180 may be formed in the area of the joint 120 that faces the second partition 142. The coupling portion 180 may be formed by cutting a part of the joint 120. The coupling portion 180 may form a space within the airbag cushion 100 to accommodate the diffuser 200 and the inflator.

The diffuser 200 may be coupled to the airbag cushion 100 and may distribute the gas moving towards the first main chamber 161, second main chamber 162, and third main chamber 163 of the airbag cushion 100. The diffuser 200 may be arranged in the coupling portion 180 of the airbag cushion 100 and may include a support member 210 that houses the inflater internally, and a first outlet port 220 and a second outlet port 230 that are connected to the support member 210 and disposed in the first sub-chamber 165 of the chambers 160 of the airbag cushion 100. Here, the first outlet port 220 may direct the movement of gas towards the first main chamber 161 of the airbag cushion 100, and the second outlet port 230 may direct the movement of gas towards the second main chamber 162 of the airbag cushion 100.

As described above, the curtain airbag apparatus 1 according to an embodiment of the present invention is capable of covering the side of a vehicle, the first-row area to the third-row area, absorbing impact that may occur to passengers.

Hereinafter, a description is made of the third main chamber 163 of the airbag cushion 100 in detail.

Figure 2:
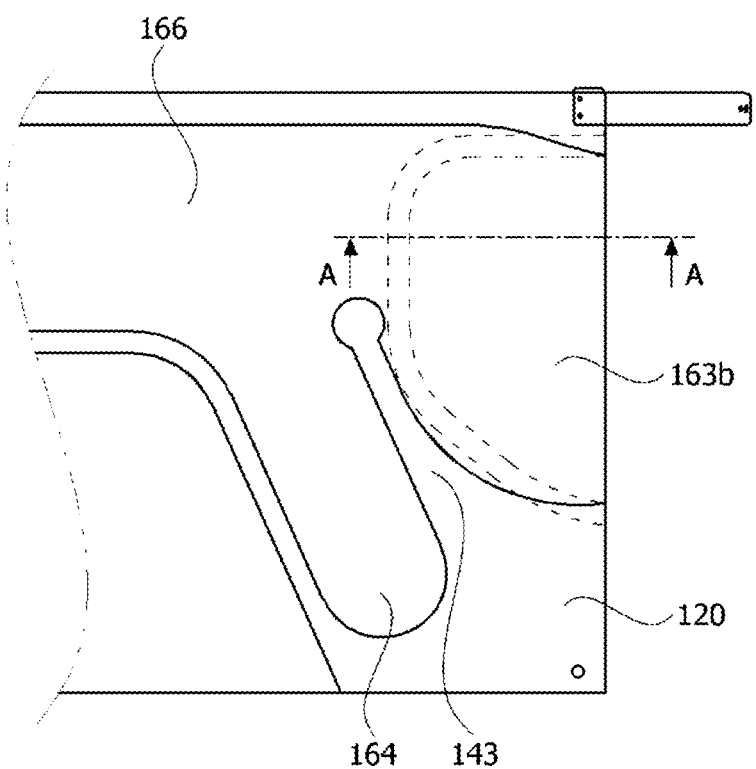
FIG. 2 is a diagram illustrating a folded configuration of a second expansion part of a third main chamber.
Figure 3:
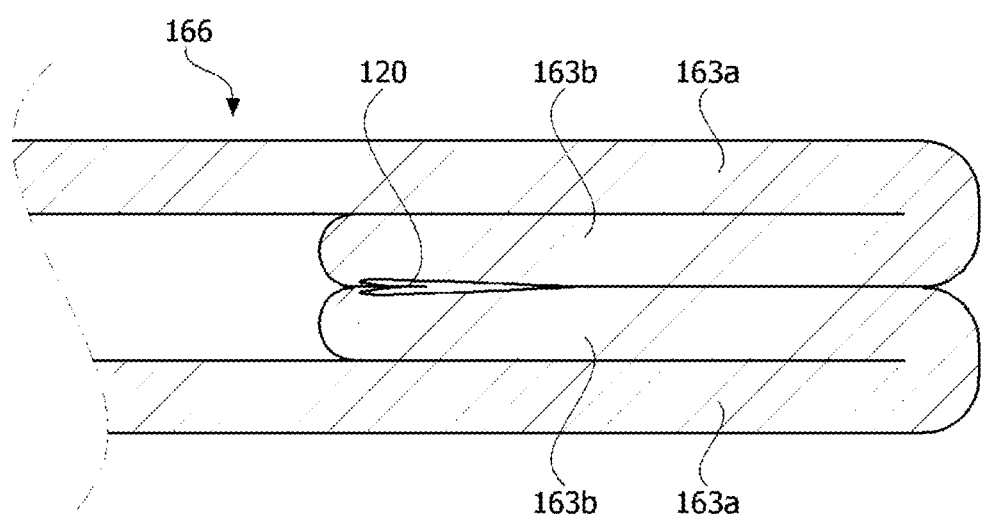
FIG. 3 is a cross-sectional view taken along line A-A in FIG. 2.

FIG. 2 is a diagram illustrating a folded configuration of a second expansion part of a third main chamber, and FIG. 3 is a cross-sectional view taken along line A-A in FIG. 2.

With reference to FIGS. 1 to 3, and more specifically to FIGS. 2 and 3, the third main chamber 163 of the chambers 160 of the airbag cushion 100 may include a first inflation portion 163*a* and a second inflation portion 163*b*.

The first inflation portion 163*a* may be an area adjacent to the third partition 143 of the partitions 140 within the third main chamber 163 of the airbag cushion 100 along the length direction. The first inflation portion 163*a* may be connected to the second sub-chamber 166 of the airbag cushion 100. Therefore, during deployment of the airbag cushion 100, the first inflation portion 163*a* may inflate by gas distributed through the diffuser 200.

The second inflation portion 163*b* may be an area positioned behind the first inflation portion 163*a* along the length direction. The second inflation portion 163*b* may be connected to the first inflation portion 163*a*. The second inflation portion 163*b* may inflate by gas flowing into the first inflation portion 163*a*. The second inflation portion 163*b* may be positioned more outward along the length direction than a part of the joint 120 of the airbag cushion 100.

The third main chamber 163, configured in this way, may maintain a folded state in predetermined part before deployment. In more detail, as shown in FIGS. 2 and 3, the second inflation portion 163*b* may maintain a folded state inside the first inflation portion 163*a* before deployment of the airbag cushion 100. Furthermore, the second inflation portion 163*b*, which maintains a folded state inside the first inflation portion 163*a*, may be positioned along the same line as a part of the joint 120 of the airbag cushion 100. As a result, the length of the folded airbag cushion 100 becomes shorter than the length of the deployed airbag cushion 100, thereby improving the ease of packaging and placement inside the vehicle.

With reference to FIGS. 2 and 3, the second inflation portion 163*b* may maintain a folded state inside the first inflation portion 163*a* before deployment of the airbag cushion 100, and after deployment of the airbag cushion 100, the second inflation portion 163*b* may inflate by gas flowing into the first inflation portion 163*a*. In detail, the folded second inflation portion 163*b* may be deployed along the direction from the second main chamber 162 towards the third main chamber 163 by being pushed by the gas distributed through the diffuser 200.

In more detail, the second inflation portion 163*b*, positioned inside the first inflation portion 163*a* in a folded state, begins to push outward towards the exterior of the first inflation portion 163*a* along the length direction, driven by the gas passing through the second sub-chamber 166 of the airbag cushion 100. Concurrently, the gas passing through the second sub-chamber 166 of the airbag cushion 100 moves towards the extra chamber 164, causing the airbag cushion 100 to deploy while rolling towards the floor of the passenger compartment in the vertical direction. This deployment structure of the airbag cushion 100 may create a situation where the third main chamber 163 of the airbag cushion 100, when deployed, is positioned in front of the rear pillar trim along the width direction (towards the driver's seat from the passenger seat or vice versa) crossing the length direction.

This configuration is capable of preventing situations where the traditional airbag cushion, which does not have the folded second inflation portion 163*b* inside the first inflation portion 163*a*, may be obstructed by the side of the rear pillar trim located in the third-row area of the vehicle, causing delay or failure in deployment when inflated by gas.

As described above, the curtain airbag apparatus 1 according to an embodiment of the present invention has a structure capable of preventing deployment delays across the entire area of the airbag cushion 100, thereby preventing harm to passengers due to partial delayed deployment of the airbag cushion 100, particularly those seated in the third-row area.

According to an embodiment of the present invention, the curtain airbag apparatus is advantageous in terms of preventing the third main chamber from contacting the rear pillar trim and avoiding delays in the deployment of the airbag cushion by designing the airbag cushion with an extra chamber positioned in front of the third main chamber and a structure where the second expansion part of the third main chamber folds into the interior of the first expansion part.

While the foregoing description has focused on specific embodiments of the present invention, it should be understood that various modifications and changes can be made by those skilled in the art without departing from the spirit and scope of the invention as defined in the appended claims. Furthermore, any distinctions arising from such modifications and changes should be understood to fall within the scope of the present invention as delineated in the appended claims.

DESCRIPTION OF REFERENCE NUMERALS

| | |
|---|---|
| 1: curtain airbag apparatus | 100: airbag cushion |
| 120: joint | 140: partitions |
| 141: first partition | 142: second partition |
| 143: third partition | 144: fourth partition |
| 160: chamber | 161: first main chamber |
| 162: second main chamber | 163: third main chamber |
| 163a: first inflation portion | |
| 163b: second inflation portion | |
| 164: extra chamber | 165: first sub-chamber |
| 166: second sub-chamber | 180: coupling portion |
| 200: diffuser | 210: support member |
| 220: first outlet port | |
| 230: second outlet port | |

What is claimed is:

1. A curtain airbag apparatus for a vehicle, the curtain airbag apparatus comprising:
   an airbag cushion comprising a first main chamber, a second main chamber, and a third main chamber respectively arranged in a first-row area, a second-row area, and a third-row area in the vehicle;
   an extra chamber arranged or disposed between the second main chamber and the third main chamber; and
   a diffuser coupled to the airbag cushion and is configured, upon deployment of the airbag cushion, to:
   distribute gas directed towards the first main chamber and the second main chamber; and
   distribute gas from the second main chamber to the third main chamber,
   wherein the extra chamber is configured to pull the third main chamber downward to increase airflow from the second chamber and accelerate deployment of the third main chamber,
   wherein the curtain airbag apparatus is configured to be installed between a plurality of pillar trims in the vehicle,
   wherein the third main chamber comprises:
   a first inflation portion configured to be inflated by gas distributed through the diffuser during deployment of the airbag cushion; and
   a second inflation portion connected to the first inflation portion and configured to be inflated by gas flowing into the first inflation portion, and
   wherein the second inflation portion is configured to maintain a folded state inside the first inflation portion before deployment of the airbag cushion.

2. The curtain airbag apparatus of claim 1, wherein the airbag cushion further comprises partitions positioned between the first main chamber, the second main chamber, and the third main chamber, and
   wherein the partitions include:
   a first partition positioned in the main chamber;
   a second partition positioned between the first main chamber and the second main chamber; and
   a third partition compartmentalizing the third main chamber and the extra chamber.

3. The curtain airbag apparatus of claim 2, wherein the extra chamber is arranged closer to the second main chamber than to the third main chamber.

4. The curtain airbag apparatus of claim 1, wherein the folded second inflation portion is configured to be deployed along the direction from the second main chamber toward the third main chamber by being pushed by the gas distributed through the diffuser.

5. The curtain airbag apparatus of claim 2, wherein, in the state of being deployed, the extra chamber comprises a lower end positioned lower than a lower end of the third main chamber.

* * * * *